Inventor:
Hitosi Siio.
per H. W. Plucker
Attorney

Patented Oct. 16, 1923.

1,470,939

UNITED STATES PATENT OFFICE.

HITOSI SIIO, OF NISIKASUGAI GUN, JAPAN.

SYNCHRONOUS DYNAMO-ELECTRIC MACHINE.

Application filed May 29, 1919. Serial No. 300,627.

*To all whom it may concern:*

Be it known that I, HITOSI SIIO, a subject of the Emperor of Japan, residing at No. 35 Simpukuji, Syonai Mura, Nisikasugai Gun, Prefecture of Aichi, in the Empire of Japan, have invented certain new and useful Improvements in Synchronous Dynamo-Electric Machines, of which the following is a specification.

This invention relates to synchronous dynamo-electric machines, and has for its primary object to produce a machine which operates with high efficiency and without sparking, either as a synchronous motor or as a converter of alternating into direct currents.

The machine according to the present invention is composed of two principal parts, namely, a transformer and a motor. The construction of the transformer may be of any type adapted to produce a rotary potential around a commutator by means of the primary polyphase alternating current.

In one embodiment of the invention the transformer comprises a primary polyphase winding, a secondary winding arranged in the rotary field produced by the said primary and a commutator connected electrically to the said secondary, while the motor is an induction motor having the same number of poles as that of the transformer primary winding on the said commutator, and also provided with one or more windings on its rotor, preferably the same number of windings as that of the poles, one or more (the same number as the said windings) pairs of brushes bearing on the commutator and fixed to the said rotor, the brushes of each pair arranged with a small phase difference apart, electrical connections between the pairs of brushes and the rotor windings respectively, and means for maintaining relative rotation at synchronous speed between the brushes and the commutator.

In order that the invention may be fully understood a preferred embodiment thereof will now be described in the accompanying drawings in which.

Figure 1:
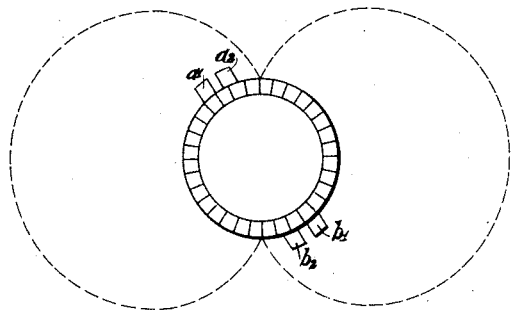
Fig. 1 is a diagram showing the potential distribution around the commutator by means of broken lines.
Figure 4:
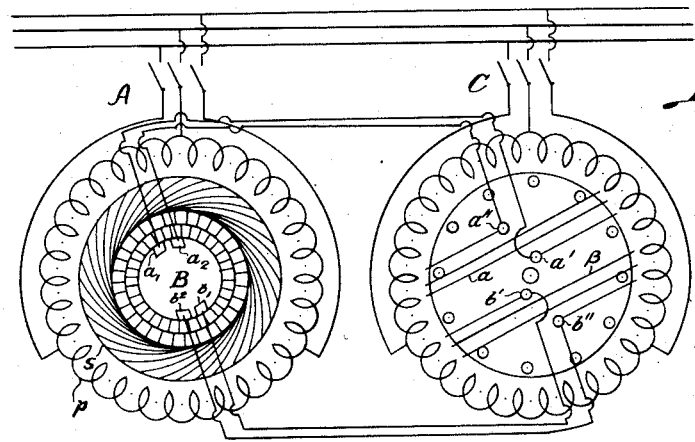
Fig. 4 is a diagrammatic showing of the complete machine in the case where the motor has two windings on its rotor and there are two pairs of brushes.
Figure 5:
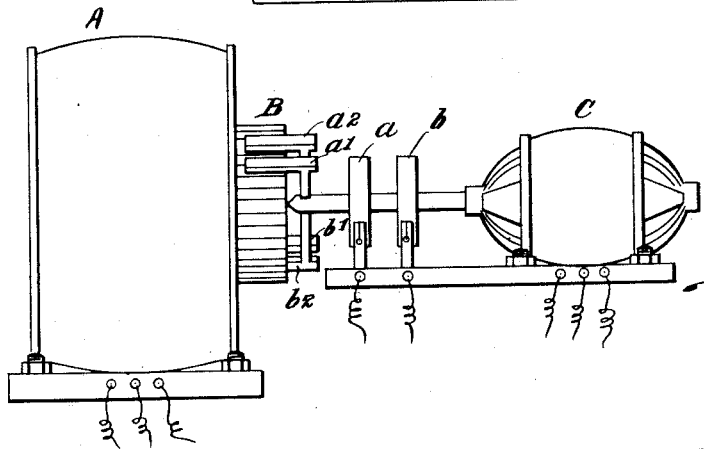
Fig. 5 is a side elevation of the machine adapted to operate as a converter.

In Figs. 4 and 5, A denotes the primary windings, which are adapted to receive polyphase current. In the example illustrated the primary has three phases and one pair of poles per phase, but there need not be any distinct pole pieces, it being necessary only that the primary coils $p$ be arranged to create a rotary magnetic field. The secondary windings $s$ are wound like the armature of a direct current generator, being connected to the commutator B, which is fixed. Two pairs of brushes $(a_1 a_2)$ and $(b_1 b_2)$ are arranged to rotate in contact with the commutator, the corresponding brushes of each pair making contact with preferably consecutive commutator segments as clearly shown in Fig. 1, or at least in such a manner as to give a small difference in phase between the two sets of brushes. The brushes are rotated by means of a small induction motor C of the squirrel cage type, fed from the same polyphase circuit as the primary $p$. The rotor of the induction motor has two coils $\alpha \beta$ the terminals $(a^1 a^{11})$ and $(b^1 b^{11})$ of which are connected electrically to the brushes $(a_1 a_2)$ and $(b_1 b_2)$ respectively.

Fig. 5 shows the machine designed as a converter. $a$ and $b$ are the slip rings connected electrically to the brushes $(a_1 b_1)$ or to the brushes $(a_2 b_2)$ or to a third pair of brushes also consecutively arranged on the commutator and rotated similarly to the other brushes (as at Fig. 6). Direct current is delivered by the slip rings. Both the primary $p$ and the secondary $s$ are fixed, and the whole transformer A can conveniently be placed in an oil tank.

Figure 6:
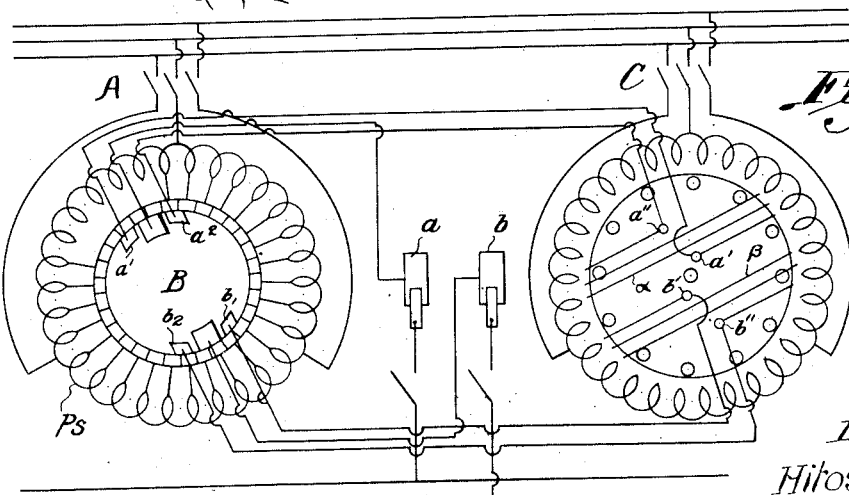
Fig. 6 is a diagram showing another arrangement of the machine.

Fig. 6 shows diagrammatically the machine designed as a converter, this figure showing the transformer constructed as an auto-transformer, the slip rings $a$, $b$ being connected to a third set of brushes placed midway between the brushes $a_1$—$a_2$ and $b_1$—$b_2$. This third set of brushes carries the main current of the converter through the said slip rings.

The chief obstacles to commutating a rotary potential is that the potential difference in the secondary circuit depends upon the variable phase of the rotating brushes, and that the secondary current is variable; when the phase of contact between the brushes and the commutator is not coincident with the maximum or the minimum of the rotating potential at the commutator B, there will be sparking.

The machine of this invention is free from this objection because the angular position of the rotor is determined by the angular position of maximum or minimum potential at the commutator except for a negligible lag due to friction, and the brushes and the commutator potential are always in phase with each other.

When operating as a converter the efficiency of the machine is as high as that of a good transformer, and the moving parts are very small and light, while no exciting current is necessary. The rotor has to overcome only small frictional resistances and the motor losses are small.

Figure 2:
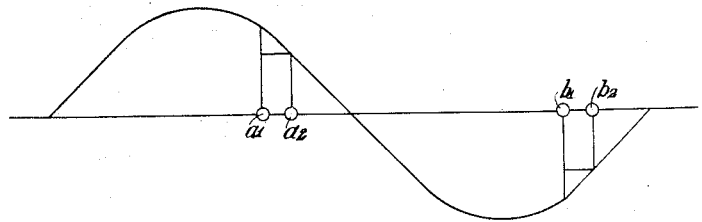
Figs. 2 and 3 show the disposition of the brushes relative to the potential and the potential differences between different brushes.
Figure 3:
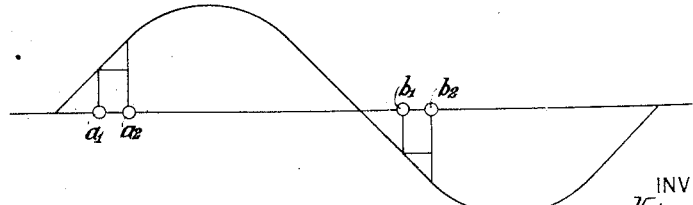

Synchronism is maintained owing to the potential differences which arise between the brushes $a_1$ and $a_2$ and between the brushes $b_1$ and $b_2$ when the phase of the brushes is not coincident with the maximum or the minimum potential, as shown in Figs. 2 and 3. These potential differences create a current in the windings $\alpha$ and $\beta$ which automatically regulates the machine.

The motion of the synchronous motor and of the converter is given by the differential equation:

$$I\frac{d^2u}{dt^2}+C\frac{du}{dt}+\frac{2\phi}{r}\left\{2E\sin u+\phi\frac{du}{dt}\cos(u-\delta)\right\}\cos(u-\delta)=F$$

Where $I$ = The moment of inertia of the rotary body.

$C$ = The torque per unit slip velocity.

$E$ = The maximum potential on commutator (B) multiplied by the sine of the half angle between the consecutive brushes.

$\phi$ = The flux multiplied by the number of turns of the coil $\alpha$ or $\beta$.

$r$ = The resistance of the coil $\alpha$ or $\beta$.

$F$ = The frictional torque.

$u$ = The phase difference between the bisector of the angle between the consecutive brushes, and the line of maximum potential.

$\delta$ = The phase difference between the maximum potential and the rotating field.

By a proper design, the motion can be defined by the solution $$u=\tfrac{1}{2}\left\{\sin^{-1}\left(\frac{Fr}{2E\phi}-\sin\delta\right)+\delta\right\}$$

of the above equation, i. e. a synchronous rotation at that phase, and this magnitude of $u$ is the lag due to friction.

I claim:—

1. In a converting apparatus, the combination of a static transformer having its primary winding designed to produce a rotating field and its secondary winding connected to a commutator, two pairs of brushes slightly displaced from each other and designed to co-operate with said commutator, a synchronous motor mechanically connected with said brushes to produce synchronous rotation thereof, said motor comprising a polyphase primary winding, and a secondary member provided with a squirrel cage winding and two separate direct current exciting windings, each of said exciting windings being connected to one of said pairs of slightly displaced brushes to produce synchronous rotation of said motor.

2. In a converting apparatus as in claim 1, a pair of slip rings mounted on the rotor shaft of said motor, and from which slip rings secondary direct current is led out, one of the pairs of said brushes being connected to the said slip rings.

3. In a converting apparatus as in claim 1, a third pair of brushes slightly displaced from the said two pairs of brushes, and also designed to cooperate with said commutator, a pair of slip rings, mounted on the rotor shaft of the said motor, which are connected to the said third pair of brushes, from which slip rings secondary direct current is led out.

4. In a converting apparatus as in claim 1, additional windings on the rotor of the said motor, adapted to regulate the motion of the said rotor, by assisting the other windings.

In testimony whereof I affix my signature in presence of two witnesses.

HITOSI SIIO.

Witnesses:
WM. R. LANGDON,
S. HORIYE.